United States Patent [19]

Harase et al.

[11] 4,302,091
[45] Nov. 24, 1981

[54] BOUND PREVENTING DEVICE FOR FOCAL PLANE SHUTTERS

[75] Inventors: Toshikatsu Harase; Toshihisa Saito, both of Tokyo; Nobuyoshi Inoue, Kawagoe, all of Japan

[73] Assignee: Copal Company Limited, Tokyo, Japan

[21] Appl. No.: 100,139

[22] Filed: Dec. 4, 1979

[30] Foreign Application Priority Data

Dec. 6, 1978 [JP] Japan ................. 53-151413

[51] Int. Cl.³ .............................................. G03B 9/40
[52] U.S. Cl. .................................... 354/246; 354/252
[58] Field of Search ................ 354/241, 245–249, 354/252, 266

[56] References Cited

U.S. PATENT DOCUMENTS

3,847,476 11/1974 Onda et al. ..................... 354/252
3,946,413 3/1976 Onda et al. ..................... 354/252 X
4,109,266 8/1978 Inoue ................................ 354/246
4,110,772 8/1978 Nakagawa et al. .............. 354/246
4,142,789 3/1979 Koyama et al. ................ 354/266 X Primary Examiner—John Gonzales
Attorney, Agent, or Firm—Cushman, Darby & Cushman

[57] ABSTRACT

A bound preventing device for focal plane shutters which is provided with a rear blade operating arm which can move a rear blade between an exposure aperture covering position and opening position and a brake lever which is set in the motion track of the rear blade operating arm and can collide with a rear blade operating lever in order to control the rear blade operating arm in the final stage of the motion of the rear blade operating arm so as to prevent bounds when the motion of the rear blade ends. This brake lever can also catch the rear blade operating arm when it collides with the rear blade operating arm.

7 Claims, 12 Drawing Figures

BOUND PREVENTING DEVICE FOR FOCAL PLANE SHUTTERS

BACKGROUND OF THE INVENTION (a) Field of the Invention

This invention relates to a curtain (blade) bound preventing device adapted to focal plane shutters of a type formed so that both front curtain (front blade) and rear curtain (rear blade) may be in an exposure aperture covering position in the cocked and uncocked states of the shutter.

(b) Description of the Prior Art

Figure 1A:
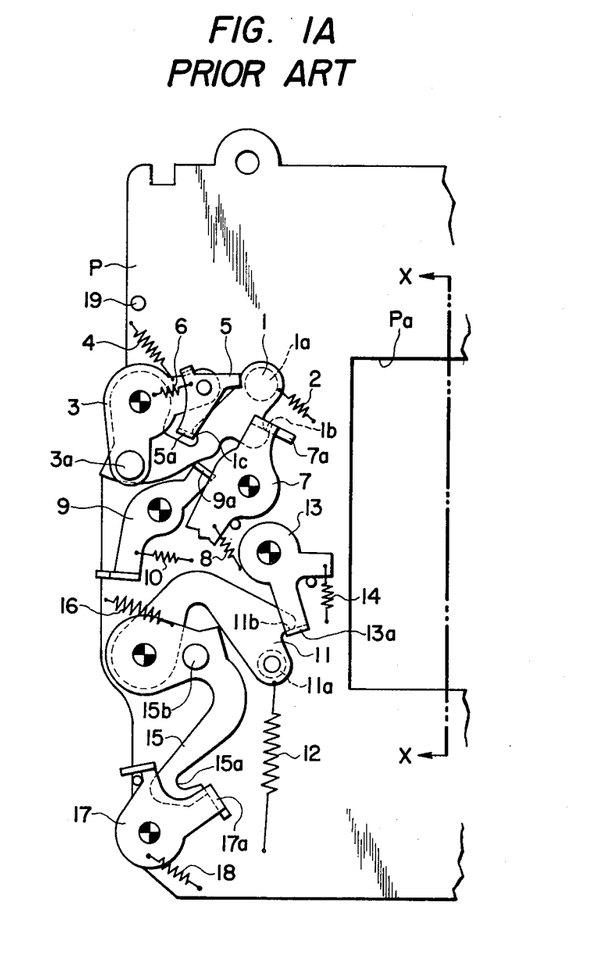
FIG. 1A is plan view showing a blade opening and closing mechanism part of a conventional focal plane shutter of a type formed so that a rear blade group may be brought to the exposure aperture covering position even when in the cocked state and uncocked state.
Figure 1B:
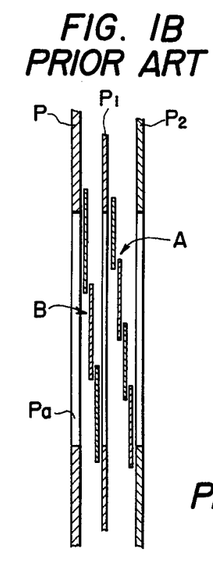
FIG. 1B is a partial sectional view along the line X—X in FIG. 1A.
Figure 1C:
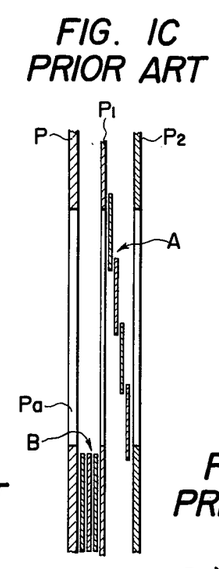
FIGS. 1C to 1E are partial sectional views corresponding to FIG. 1B showing the respective operating positions of the front blade group and rear blade group.
Figure 1D:
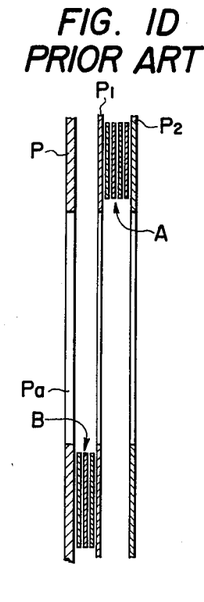
Figure 1E:
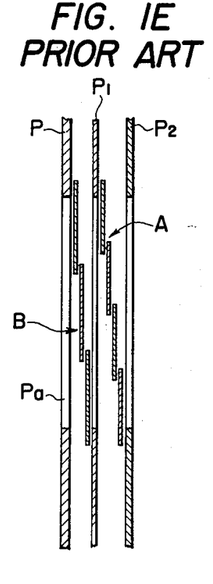

This type of focal plane shutter is excellent in respect of being able to effectively prevent light leakage. Its conventional example shall be briefly explained in the following with reference to FIGS. 1A to 1E. In FIG. 1A, symbol P denotes a shutter base plate having an exposure aperture Pa, reference numeral 1 denotes a front blade operating arm which is pivoted on the base plate P and has a pin 1a and hook portions 1b and 1c, 2 denotes a spring for biasing the front blade operating arm 1 clockwise, 3 denotes a front blade driving arm which is pivoted concentrically with the front blade operating arm 1 on the base plate P and has a pin 3a, 4 denotes a spring for biasing the front blade driving arm 3 counterclockwise, 5 denotes a connecting lever which is pivoted on the front blade driving arm 3 and has a bent portion 5a engageable with the hook portion 1c, 6 denotes a spring for biasing the connecting lever 5 counterclockwise, 7 denotes a front blade locking lever which is pivoted on the base plate P and has a bent portion 7a engageable with the hook portion 1b, 8 denotes a spring for biasing the front blade locking lever 7 counterclockwise. 9 denotes an X-contact lever which is pivoted on the base plate P and has a bent portion 9a engaged with the side wall of the front blade operating lever 1, 10 denotes a spring for biasing the X-contact lever 9 counterclockwise, 11 denotes a rear blade operating arm which is pivoted on the base plate P and has a pin 11a and hook portion 11b, 12 denotes a spring for biasing the rear blade operating arm 11 clockwise, 13 denotes a release lever which is pivoted on the base plate P and has a bent portion 13a engageable with the hook portion 11b, 14 denotes a spring for biasing the release lever 13 clockwise, 15 denotes a rear blade driving arm which is pivoted concentrically with the rear blade operating arm 11 on the base plate P and has a curved portion 15a and pin 15b, 16 denotes a spring for biasing the rear blade driving arm 15 counterclockwise, 17 denotes a rear blade locking lever which is pivoted on the base plate P and has a bent portion 17a, engageable with the tip portion of the rear blade driving arm 15, 18 denotes a spring for biasing the rear blade locking lever 17 counterclockwise and 19 denotes a pin which is erected on the base plate P and is engageable with the connecting lever 5. Here, the springs 4 and 10 are so selected as to be stronger than the spring 2 and the spring 16 is so selected as to be stronger than the spring 12.

In FIGS. 1B to 1E, symbol P₁ denotes an intermediate plate which is secured at a predetermined spacing on the base plate P and has an aperture aligned with the exposure aperture Pa, P₂ denotes a cover plate which is secured at a predetermined spacing on the intermediate plate P₁ and has an aperture aligned with the exposure aperture Pa, A denotes a front blade group which is arranged in a space sectioned by the intermediate plate P₁ and cover plate P₂ and consists of a plurality of opaque laminae and B denotes a rear blade group which is arranged in a space sectioned by the base plate P and intermediate plate P₁ and consists of a plurality of opaque laminae. The front blade group A is operatively connected with the pin 1a of the front blade operating arm 1 and is so arranged as to be able to take the respective illustrated positions in response to the rotating position of the front blade operating arm 1. The rear blade group B is operatively connected with the pin 11a of the rear blade operating arm 11 and is so arranged as to be able to take the respective illustrated positions in response to the rotating position of the rear blade operating arm 11.

FIG. 1A shows a cocked state of the shutter. In this state, when the shutter is released, first the release lever 13 will be rotated counterclockwise. By this rotation of the release lever 13, the rear blade operating arm 11 will be rotated clockwise to the position wherein the pin 11a engages with the curved portion 15a of the rear blade driving arm 15 and will move the rear blade group B to the position in FIG. 1C from the position in FIG. 1B. That is to say, the rear blade group B will be moved from the exposure aperture Pa covering position to the opening position so as to be ready for the subsequent exposing operation. In the next stage of the shutter release, the front blade locking lever 7 will be rotated clockwise to release the front blade operating arm 1. In the cocked state of the shutter, as the front blade operating arm 1 is connected with the front blade driving arm 3 through the connecting lever 5, when the front blade operating arm 1 is released, said arm 1 will be rotated counterclockwise integrally with the front blade driving arm 3 by the force of the spring 4. At this time, the X-contact lever 9 will be also rotated counterclockwise following the front blade operating arm 1 by the force of the spring 10. By this counterclockwise rotation of the front blade operating arm 1, the front blade group A will be moved from the position in FIG. 1C to the position shown in FIG. 1D and will open the exposure aperture Pa to start the exposure. In the final stage of this shutter opening stroke, the connecting lever 5 will collide with the pin 19 and will be rotated clockwise, therefore the front blade operating arm 1 will separate from the front blade driving arm 3 and the counterclockwise rotating motion of the front blade operating arm 1 will be ended. In this case, the front blade operating arm 1 will tend to be rotated clockwise by the force of the spring 2 but will be prevented by the X-contact lever 9 from this rotation and will therefore remain the front blade group A in its opening position. Thereafter, when a proper exposure time elapses, the rear blade locking lever 17 will be rotated clockwise by a well known exposure controlling means to release the rear blade driving arm 15. When the rear blade driving arm 15 is thus released, said arm 15 will be rotated counterclockwise together with the rear blade operating arm 11 by the force of the spring 16. Therefore, the rear blade group B will move from the position in FIG. 1D to the position shown in FIG. 1E and will close the exposure aperture Pa to end one exposure. In the final stage of this counterclockwise rotation of the rear blade driving arm 15, the X-contact lever 9 will be rotated clockwise to the illustrated position by said arm 15 and therefore, following it, the front blade operating arm 1 will be rotated clockwise to the illustrated position by the force of the spring 2. As a result, the front blade group A will move from the position in FIG. 1D to the position shown in FIG. 1E to cover the exposure aperture again. Thus, one exposure operation will be all completed, the front blade operating arm 1 will engage with the front blade locking lever 7 and the rear blade operating arm 11 will come to engage with the release lever 13. The shutter is cocked by simultaneously clockwise rotating the front blade driving arm 3 and rear blade driving arm 15 to the illustrated positions by means of a well known cocking member not illustrated engaged with the pins 3a and 15b.

As apparent from the above explanation, in this kind of conventional shutter, when the pin 11a of the rear blade operating arm 11 collides with the curved portion 15a of the rear blade driving arm 15 when the shutter is released, the rear blade operating arm 11 will once bound and then engage with the rear blade driving arm 15. This means that the rear blade group B will once retreat from the exposure aperture Pa and then again advance into the exposure aperture Pa. Therefore, this bounding phenomenon will result in an inaccurate exposure time to be controlled and the reduction of the durability of the shutter. As a result, there are defects that the time interval from the time of releasing the shutter to the time of starting the actual exposure must be designed to be comparatively long and that the motion speed of the blade itself can not be made high.

There is already suggested a method wherein such elastic body as of rubber is provided in the part to be collided with to prevent such bounding phenomenon. However, in such method, not only it is difficult to fix the blade starting position but also the variation with the lapse of time is likely to occur. It is not preferable.

SUMMARY OF THE INVENTION

Therefore, a primary object of the present invention is to provide a focal plane shutter of this kind which is so arranged as to effectively prevent a rear blade operating arm from bounding by making a braking force act on the rear blade operating arm immediately before the rear blade operating arm collides with a rear blade driving arm.

Another object of the present invention is provide a focal plane shutter of this kind which is so arranged that a rear blade operating arm may be caught by a lever member so as to be unable to bound when it engages with a rear blade driving arm.

A further object of the present invention is to provide a focal plane shutter of this kind which is so arranged as to make a braking force act on a rear blade operating arm in the final stage of its motion even when the rear blade operating arm is moved to the position in which a rear blade group covers an exposure aperture.

These and other objects of the present invention will become more apparent during the course of the following detailed description and appended claims.

DESCRIPTION OF THE PREFERRED EMBODIMENTS

In each embodiment explained in the following, only a rear blade driving mechanism is shown but the same mechanism as is explained in reference to FIG. 1A can be used for a front blade driving mechanism.

Figure 2A:
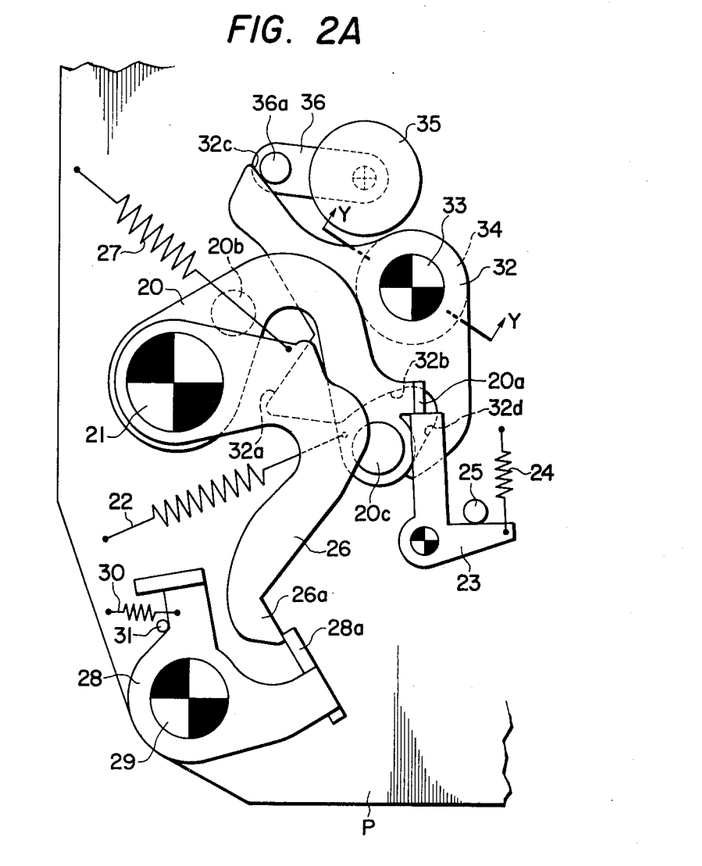
FIG. 2A is a partial plan view showing an embodiment of a rear blade driving mechanism of a focal plane shutter according to the present invention.
Figure 2B:
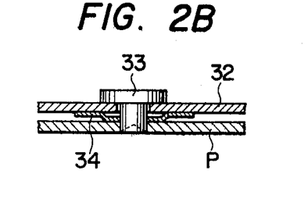
FIG. 2B is a partial sectional view along the line Y—Y in FIG. 2A.

First, in FIG. 2A, reference numeral 20 denotes a rear blade operating arm which is pivoted on a shutter base plate P by a shaft 21 and has a bent portion 20a and pins 20b and 20c, 22 denotes a spring for biasing the rear blade operating arm 20 clockwise, 23 dentoes a release lever which is pivoted on the base plate P and is engageable with the bent portion 20a of the rear blade operating arm 20, 24 denotes a spring for biasing the release lever 23 counterclockwise, 25 denotes a stopper for restricting the counterclockwise rotation of the release lever 23, 26 denotes a rear blade driving arm which is pivoted on the base plate P by the shaft 21 and has a hook portion 26a, 27 denotes a spring for biasing the rear blade driving arm 26 counterclockwise, 28 denotes a locking lever which is pivoted on the base plate P by the shaft 29 and has a bent portion 28a engageable with the rear blade driving arm 26a, 30 denotes a spring for biasing the locking lever 28 counterclockwise, 31 denotes a stopper for restricting the counterclockwise rotation of the locking lever 28, 32 denotes a brake lever which is pivoted on the base plate P by a shaft 33 and has sides 32a, 32b, 32c and 32d, 34 denotes a friction plate which is made of a dish-shaped washer or the like, is interposed between the base plate P and brake lever 32 and has a resiliency for giving a proper rotation resistance (frictional force) to the brake lever 32, 35 denotes an elastic stopper which is secured on the base plate P and is for restricting the clockwise rotation of the brake lever, and 36 denotes a lever which is pivoted on the base plate P and has a pin 36a engageable with the side 32c of the brake lever 32. Here the resiliency is so selected that the spring 27 may be stronger than the spring 22. The pin 20c is operatively connected with the rear blade group B in a conventional manner so as to be able to move the rear blade group B between the exposure aperture Pa covering position and opening position. The rear blade operating arm 20, spring 22, rear blade driving arm 26 and spring 27 form a rear blade driving means. The brake lever 32 and friction plate 34 form a brake means.

The operation of the above mentioned mechanism is as follows.

Figure 2C:
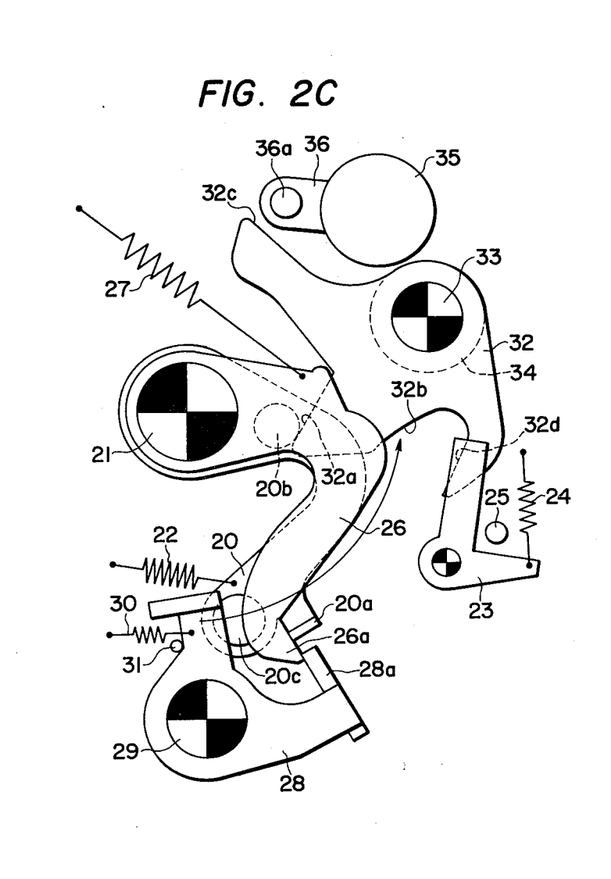
FIGS. 2C and 2D are partial plane views showing operating positions different from each other of the mechanism shown in FIG. 2A.

FIG. 2A shows a shutter as cocked. In this state, when the shutter is released, the release lever 23 will be rotated clockwise against the spring 24 to release the rear blade operating arm 20. Therefore, the rear blade operating arm 20 will be rotated clockwise by the spring 22 to the position in which the bent portion 20a engages with the hook portion 26a of the rear blade driving arm 26 to move the rear blade group B through the pin 20c to the exposure aperture Pa opening position. In this case, as the pin 20b is so arranged as to engage with the side 32a of the brake lever to counterclockwise rotate the brake lever 32 against its frictional force just before the bent portion 20a engages with the hook portion 26a, the rear blade operating arm 20 will be quickly decelerated the moment it engages with the brake lever 32 (See FIG. 2C). Therefore, the bound of the rear blade operating arm 26 caused by the collision of the bent portion 20a with the hook portion 26a will be so slight that the rear blade group B will not substantially advance again into the exposure aperture Pa.

Figure 2D:
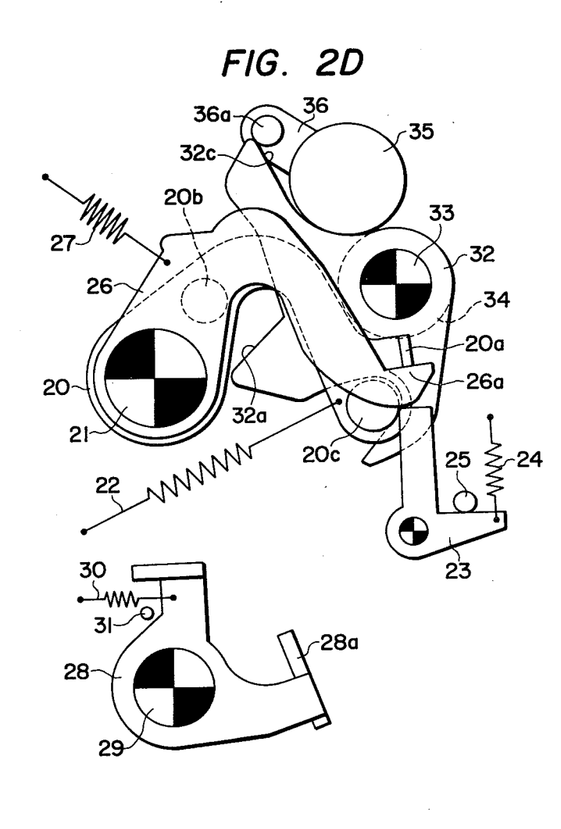

Thereafter, the exposure will be started by the same method as is explained with FIG. 1A and, when a proper exposure time elapses, the locking lever 28 will be rotated clockwise against the spring 30. Therefore, the rear blade operating arm 20 will be rotated counterclockwise integrally with the rear blade driving arm 26 by the force of the spring 27 to move the rear blade group B to the exposure aperture Pa covering position to end the exposure. In this case, too, as the pin 20c is so arranged as to engage with the side 32b of the brake lever 32 to clockwise rotate the brake lever 32 against its frictional force just before the end of the operation of the rear blade operating arm 20, the rear blade operating arm 20 and rear blade driving arm 26 will be quickly decelerated the moment the rear blade operating arm 20 engages with the brake lever 32. Thus the counterclockwise rotating motion of the rear blade operating arm 20 and rear blade driving arm 26 will be stopped by the engagement of the side of the brake lever 32 with the stopper 35 (See FIG. 2D). As can be understood from this explanation, the motion of the rear blade operating arm 20 and rear blade driving arm 26 will be stopped so softly that the shock to each part will be very little.

As the cocking operation is made in the same manner as in the case of FIG. 1A, its explanation shall be omitted. However, as the lever 36 is so arranged as to be rotated counterclockwise by this cocking operation, in this process, the brake lever 32 will be returned to the position shown in FIG. 2A.

Figure 3A:
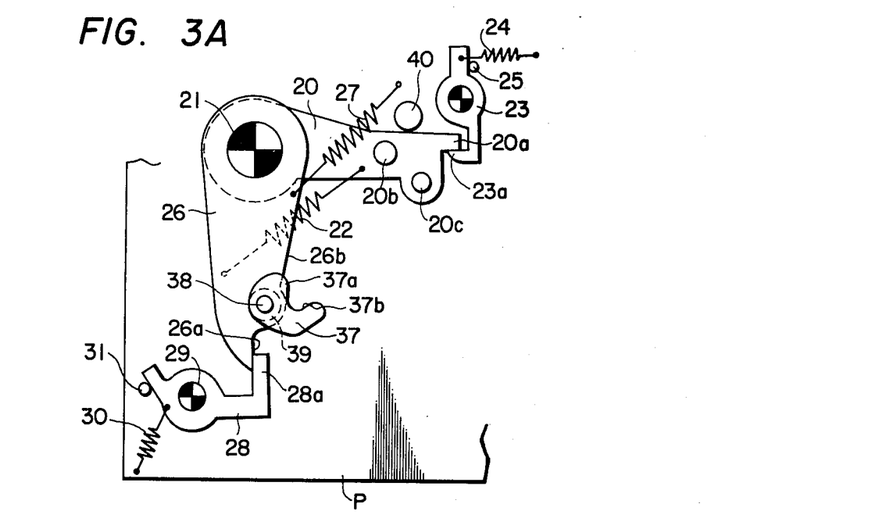
FIG. 3A is a partial plan view showing another embodiment of a rear blade driving mechanism of a focal plane shutter according to the present invention.
Figure 3B:
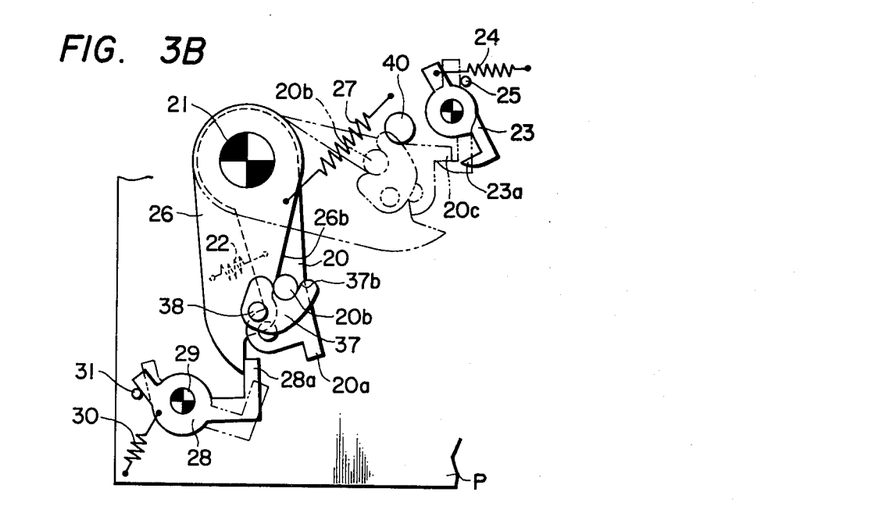
FIG. 3B is a partial plan view showing an operating position different from that in FIG. 3A.

The embodiment shown in FIG. 3A is different from the embodiment shown in FIG. 2A in respect that a brake lever 37 is pivoted on the rear blade driving arm 26 and that the rear blade operating arm 20 is so arranged as to be able to be held by a stopper pin 40 erected on the base plate P and a hook portion 23a of the release lever 23 in the final position of its motion when it is rotated counterclockwise to end the exposure. Therefore, in this embodiment, the same respective reference numerals are attached to the same component parts and portions in the function as shown in FIG. 2A. That is to say, the brake lever 37 is pivoted on the rear blade driving arm 26 by a shaft 38 and has sides 37a and 37b engageable with the pin 20b of the rear blade operating arm 20. Further, the same friction plate 39 as the friction plate 34 is interposed between the rear blade driving arm 26 and brake lever 37 so as to give a proper rotation resisting force (frictional force) to the brake lever 37. Therefore, when the rear blade operating arm 20 rotates clockwise from the position shown in FIG. 3A, just before the pin 20b collides with the side 26b of the rear blade driving arm 26, said pin 20b will engage with the side 37a of the brake lever 37 and will rotate the brake lever 37 counterclockwise. When the rear blade operating arm 20 is somewhat decelerated by this counterclockwise rotation of the brake lever 37, the pin 20b will engage with the side 26b of the rear blade driving arm 26 and, on the other hand, the other side 37b of the brake lever 37 will advance into the motion track of the pin 20b. Therefore, at this moment, the pin 20b will be held by the side 26b of the rear blade driving arm 26 and the side 37b of the brake lever 37 and thereby the bound of the rear blade operating arm 20 will be perfectly prevented (See FIG. 3B). When the rear blade operating arm 20 is rotated counterclockwise integrally with the rear blade driving arm 26 from the position in FIG. 3B in order to end the exposure, in the final stage of its rotation, the arm end portion 20a will pass while pushing the outside slope of the hook portion 23a to once rotate the release lever 23 counterclockwise, will collide with the stopper pin 40 and will be stopped. At this time, the hook portion 23a of the release lever 23 will again engage with the arm end portion 20a of the rear blade operating arm 20, therefore the rear blade operating arm 20 will be held by the stopper pin 40 and release lever 23 (as shown by the chain line in FIG. 3B) and the bound of said arm 20 will be perfectly prevented. If the rear blade driving arm 26 is rotated clockwise from the chain line position in FIG. 3B by the shutter cocking operation, the brake lever 37 will be rotated clockwise and will be separated from the pin 20b. As clear from the above explanation, in this embodiment, the brake lever 37 functions mostly as a catching means for preventing the bound of the rear blade operating lever 20.

Figure 4:
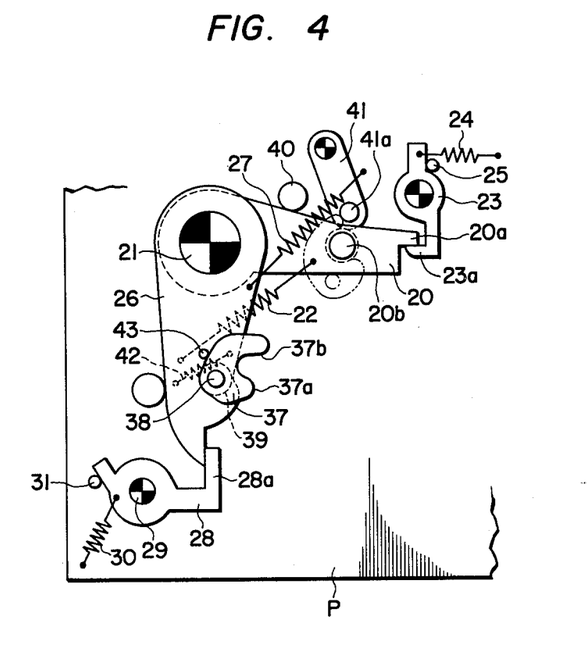
FIG. 4 is a partial plan view showing further another embodiment of a rear blade driving mechanism of a focal plane shutter according to the present invention.

FIG. 4 further shows another embodiment. This embodiment is different from the embodiment shown in FIG. 3A in respect that, when the brake lever 37 collides with the pin 20b of the rear blade operating arm 20, it will be rotated clockwise to prevent the bound of the rear blade operating arm 20, that the pin 20b is also a connecting pin with the rear blade group B and that, in case the rear blade driving arm 26 is rotated clockwise by the shutter cocking operation, the brake lever 37 will be rotated counterclockwise by a pin 41a erected on a lever 41 and will be thereby separated from the pin 20b. In this embodiment, too, the same respective reference numerals are attached to the same component parts and portions in the function as shown in FIG. 3A. That is to say, when the rear blade operating arm 20 is rotated clockwise from the illustrated position, just before the pin 20b collides with the side of the rear blade driving arm 26, said pin 20b will engage with the side 37a of the brake lever 37 and will rotate the brake lever 37 clockwise. With this clockwise rotation of the brake lever 37, the other side 37b will advance into the motion track of the pin 20b and thereby the bound of the rear blade operating arm 20 will be perfectly prevented. The lever 41 is pivoted on the base plate P, has the pin 41a engageable with the brake lever 37 and is so arranged as to be able to be rotated clockwise from the illustrated position by the shutter cocking operation. Therefore, when the shutter is cocked, just before the rear blade driving arm 26 begins to rotate clockwise, the brake lever 37 will be rotated counterclockwise by the pin 41a so as to be separated from the pin 20b. The other operations are the same as in the embodiment shown in FIG. 3A and therefore shall not be explained here.

In the embodiment in FIG. 4, some rotation resisting force is given to the brake lever 37 by the presence of the friction plate 39 but, instead of giving this resisting force, as shown by the dotted line, a weak spring 42 may be connected between the rear blade driving arm 26 and brake lever 37 to bias the brake lever 37 counterclockwise. In this case, the counterclockwise rotation of the brake lever 37 will be restricted by a pin 43 erected on the rear blade driving arm 26.

We claim:

1. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front and rear blades being in said exposure aperture covering position when the shutter is cocked, said rear blade being first moved to said exposure aperture opening position and then said front blade being moved to said exposure aperture opening position to start an exposure when the shutter is released, and said rear blade being moved to said exposure aperture covering position to end the exposure when a proper exposure time lapses, characterized in that said shutter further comprises a reciprocally operable brake means which is provided in association with said rear blade driving means, whereby said rear blade is braked by said brake means which is operated in one direction when said rear blade is moved from said exposure aperture covering position to said exposure aperture opening position and is braked by said brake means which is operated in the other direction when said rear blade is moved from said exposure aperture covering position to said exposure aperture opening position.

2. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front and rear blades being in said exposure aperture covering position when the shutter is cocked, said rear blade being first moved to said exposure aperture opening position and then said front blade being moved to said exposure aperture opening position to start an exposure when the shutter is released, and rear blade being moved to said exposure aperture covering position to end the exposure when a proper exposure time lapses, characterized in that said shutter further comprises a brake means which is provided in association with said rear blade driving means, whereby said rear blade is braked by said brake means in the final stage of the movement from said exposure aperture covering position to said exposure aperture opening position, said rear blade being braked by said brake means in the final stage of the movement from said exposure aperture opening position to said exposure aperture covering position, said brake means comprising a brake lever having a rotation resisting force and having sides engageable with said rear blade driving means in a final stage of the movement of said rear blade from said exposure aperture opening position to said exposure aperture covering position, and said sides being disengaged from said rear blade driving means when the shutter is cocked.

3. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front blade and rear blade being in exposure aperture covering position when the shutter is cocked, said rear blade being first moved to said exposure aperture opening position and then said front blade being moved to said exposure aperture opening position to start an exposure when the shutter is released, and said rear blade being moved to said exposure aperture covering position to end the exposure when a proper exposure time lapses, characterized in that said shutter further comprises a catching means which is associated with said rear blade driving means whereby, when said rear blade is moved from said exposure aperture covering position to said exposure aperture opening position so as to be ready for the exposing operation, in the final stage of its motion, said rear blade driving means will not bound, said rear blade driving means comprising an operating arm operatively connected with said rear blade and a driving arm engageable with said operating arm, said catching means comprising a catching lever pivoted on said driving arm and capable of catching said operating arm.

4. A focal plane shutter according to claim 3 wherein said catching lever has a rotation resisting force.

5. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front blade and rear blade being in exposure aperture covering position when the shutter is cocked, said rear blade being first moved to said exposure aperture opening position and then said front blade being moved to said exposure aperture opening position to start an exposure when the shutter is released, and said rear blade being moved to said exposure aperture covering position to end the exposure when a proper exposure time lapses, characterized in that said shutter further comprises a catching means which is associated with said rear blade driving means whereby, when said rear blade is moved from said exposure aperture covering position to said exposure aperture opening position so as to be ready for the exposing operation, in the final stage of its motion, said rear blade driving means will not bound, said rear blade driving means comprising an operating arm operatively connected with said rear blade and a driving arm engageable with said operating arm, and said catching means comprising a catching lever pivoted on said driving arm and resiliently biased in one direction and capable of catching said operating arm.

6. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front blade and rear blade being in exposure aperture covering position when the shutter is cocked, said rear blade being first moved to said exposure aperture opening position and then said front blade being moved to said exposure aperture opening position to start an exposure when the shutter is released, and said rear blade being moved to said exposure aperture covering position to end the exposure when a proper exposure time lapses, characterized in that said shutter further comprises a catching means which is associated with said rear blade driving means whereby, when said rear blade is moved from said exposure aperture covering position to said exposure aperture opening position so as to be ready for the exposing operation, in the final stage of its motion, said rear blade driving means will not bound, said rear blade driving means comprising an operating arm operatively connected with said rear blade and a driving arm engageable with said operating arm, said catching means comprising a catching lever pivoted on said driving arm and capable of catching said operating arm, said shutter further comprising a release lever engageable with said operating arm and a stopper pin engageable with said operating arm, and said operating arm being held by said release lever and stopper pin when said rear blade has been moved from said exposure aperture opening position to said exposure aperture covering position.

7. A focal plane shutter comprising an exposure aperture, a front blade and rear blade which can respectively move between an exposure aperture covering position and an exposure aperture opening position, a front blade driving means which is operatively connected with said front blade to move said front blade, and a rear blade driving means which is operatively connected with said rear blade to move said rear blade, said front blade and rear blade being in exposure aperture covering position when the shutter is cocked, said rear blade being first moved to said exposure aperture opening position and then said front blade being moved to said exposure aperture opening position to start an exposure when the shutter is released, and said rear blade being moved to said exposure aperture covering position to end the exposure when a proper exposure time lapses, characterized in that said shutter further comprises a catching means which is associated with said rear blade driving means whereby, when said rear blade is moved from said exposure aperture covering position to said exposure aperture opening position so as to be ready for the exposing operation, in the final stage of its motion, said rear blade driving means will not bound, said rear blade driving means comprising an operating arm operatively connected with said rear blade and a driving arm engageable with said operating arm, said catching means comprising a catching lever pivoted on said driving arm and capable of catching said operating arm, said shutter further comprising a lever engageable with said catching lever and capable of being rotated by the shutter cocking operation to disengage said catching lever from said operating arm.

* * * * *